May 10, 1927.
J. H. DENNIS
1,627,769
HORN BUTTON FOR STEERING POSTS
Filed Dec. 19, 1921
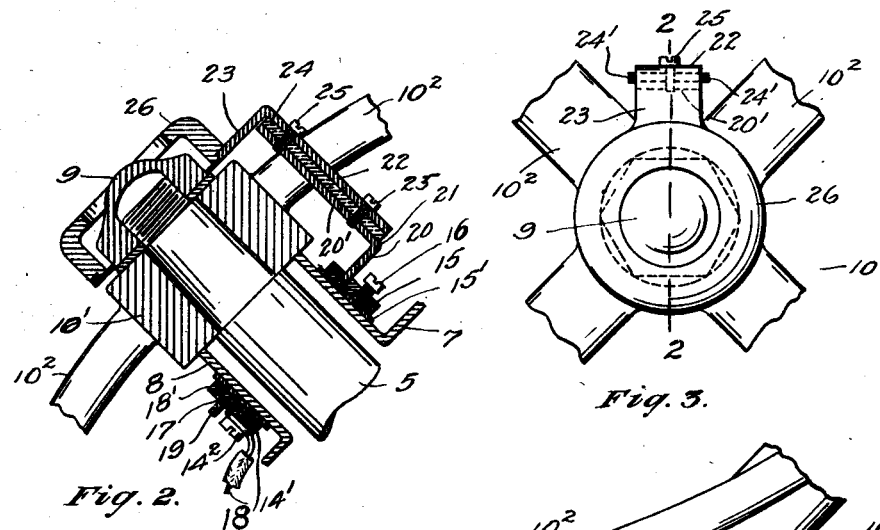
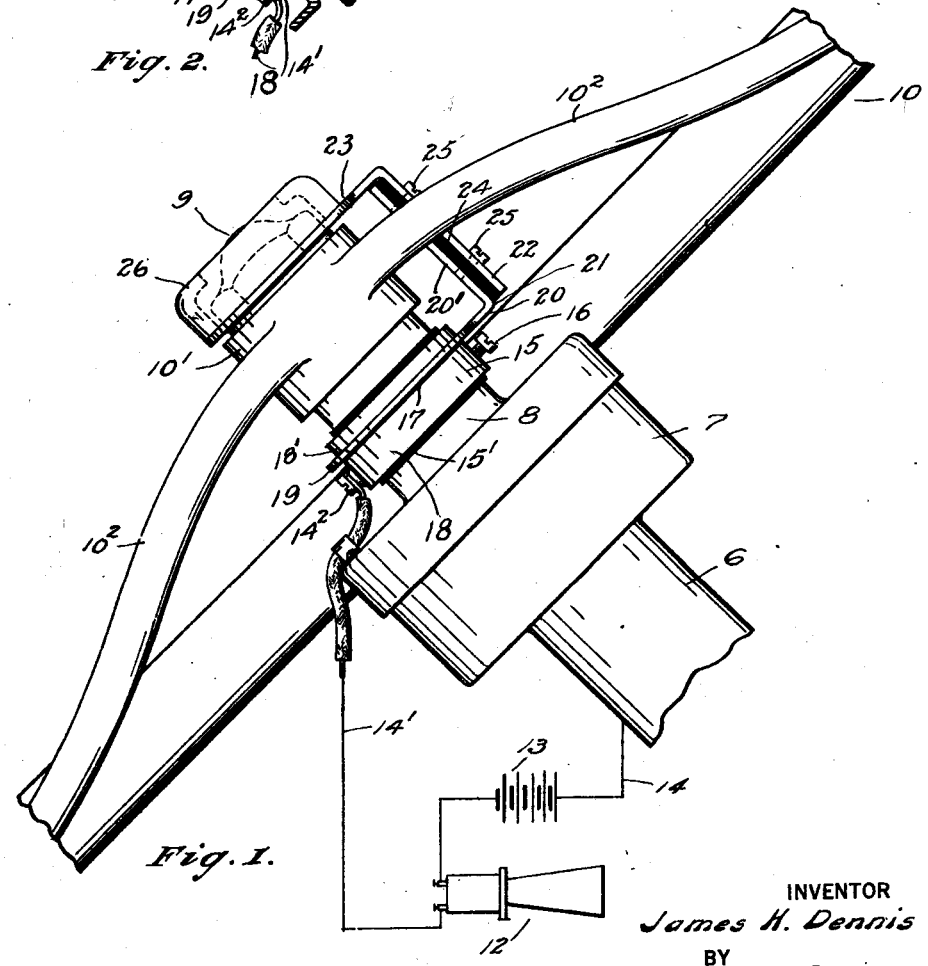
INVENTOR
James H. Dennis
BY
Pierre Barnes
ATTORNEY Patented May 10, 1927.

1,627,769

UNITED STATES PATENT OFFICE.

JAMES H. DENNIS, OF SEATTLE, WASHINGTON.

HORN BUTTON FOR STEERING POSTS.

Application filed December 19, 1921. Serial No. 523,460.

This invention relates to signalling apparatus for motor vehicles and, more especially closing devices for the circuits of electrically operated horns.

In some makes of automobiles it is the practice to equip the same with the signal horn circuit-closing switch, or horn-button so called, located below the steering wheel and upon the casing of the steering-post, a position which renders the button difficult for the operator to reach.

The present invention aims to provide an inexpensively constructed and efficient device and which may be readily applied to the equipment of an automobile of the type above referred to to facilitate the use of the signal horn without interfering with or inconveniencing the operator in the control of the car.

The invention consists, generally stated, of an attachment in the nature of an extension to the horn circuit which is connected to the steering-post casing and rotatable with the steering wheel, and which is provided above the latter with a circuit closing device within convenient reach of the operator. The invention more specifically consists in certain peculiarities of construction, adaptation and combination of parts hereinafter described and claimed.

In the accompanying drawings,—

Figure 1 is a view in side elevation of an embodiment of my invention applied to the upper portion of the support for a steering wheel, the wheel being partly broken away and the signal system shown somewhat diagrammatically. Fig. 2 is a fragmentary transverse vertical sectional view of the same, said section being taken substantially through 2—2 of Fig. 3. Fig. 3 is a plan view of Fig. 2 taken on a plane at right angles to the axis of the steering wheel.

In said drawings, the reference numeral 5 designates a steering post extending through a non-rotatable tubular casing or standard 6 having secured to its upper end a gear housing 7 provided with a cylindrical extension 8. Secured by means of a clamping nut 9 to the post 5 above the housing extension 8 is a steering wheel 10 provided with a hub $10^1$ and radial spokes $10^2$ as usual.

12 represents an electrically actuated signal horn which with a battery 13 is included in a circuit having one of its leads 14 grounded with respect to said steering post.

In carrying out the present invention, I mount upon the non-rotatable housing extension 8 a sleeve 15 but which is insulated therefrom by means of a bushing $15^1$ of suitable material.

As illustrated said sleeve is secured in place by means of a set screw 16 and is provided with a binding screw whereby the second lead $14^1$ of the aforesaid circuit is electrically connected to the sleeve 15 as by means of a binding screw $14^2$.

Said sleeve is provided with a peripheral groove 17 which is preferably afforded by constructing the ring of two interfitting parts 18 and $18^1$, whereof the part $18^1$ is in the nature of a collar which engages on a reduced portion of the other part 18. Rotatably mounted upon said sleeve within the groove 17 thereof is a ring element 19 having integral therewith an arm 20 extending radially of the ring to a bend 21 and thence upwardly to provide an arm part $20^1$ between two spokes 11 of the steering wheel as shown in Fig. 3.

Cooperating with the arm part $20^1$ is an arm part 22 which depends at approximately right angles from a plate element 23 which is desirably of an annular form so as to surround the nut 9 at a short distance above the wheel hub $10^1$.

The companion arm parts $20^1$ and 22 are separately coupled together as by means of screws 25 which, as shown in Fig. 2, extend through an insulating body 24 which is interposed between arm parts above referred to.

This insulating body protrudes, as indicated by $24^1$ in Fig. 3, from the opposite sides of the arms to prevent the latter being contacted by the adjacent spokes 11 of the wheel when turning the same in steering.

Secured to the plate element 23 is a button 26 of an insulating material, preferably of an annular shape, the internal diameters of the button and plate elements 23 being sufficiently large to accommodate the nut 9 without interfering with their operation.

With the exception of those hereinbefore specified as being of an insulating material, the above described parts of the device are constructed of electrically conducting material.

The arm elements of both the ring 19 and the plate element 23 are constructed of a material having resilient characteristics in order to yieldingly retain said plate element in a position out of contact with the nut 9 and the wheel hub 10.

In effect the plate element 23 constitutes one terminal of the horn circuit, the other terminal being the steering wheel or the clamping nut therefor if desired.

The operation of the invention will, it is thought, be readily understood from the foregoing description of the embodiment now preferred by me.

Among the advantages of the invention, is its simplicity, that it is easy to install, and that it protrudes but little if any beyond the wheel nut.

What I claim, is,—

1. In a device of the type described, the combination with an immovable housing of an automobile steering mechanism, the movable steering post projecting therefrom, and the steering wheel mounted upon the projecting portion of the post, of a contact arm bodily movably supported by the housing and projecting between the spokes of the wheel for selective electric contact with the wheel hub, and means for insulating the arm from the housing and the wheel spokes, whereby the contact arm will be moved upon its rigid supporting housing when the wheel and post are turned.

2. In a device of the type described, the combination with an immovable housing of an automobile steering mechanism, the movable steering post projecting therefrom, and the steering wheel mounted on the projecting portion of the post, of a two part member immovably mounted upon and insulated from the housing, the parts of said member being associated to form a peripheral groove, a contact arm bodily movably supported in the groove of the immovable member and projecting between the spokes of the wheel for selective electric contact with the wheel hub, and means for insulating the arm from the wheel spokes, whereby the contact arm will be moved upon its immovable member when the wheel and post are turned.

3. In a device of the type described, the combination with an immovable housing of an automobile steering mechanism, the movable steering post projecting therefrom, and the steering wheel mounted on the projecting portion of the post, of a member immovably mounted upon and insulated from the housing, a contact arm bodily movably supported by the immovable member and projecting between the spokes of the wheel for selective electric contact with the wheel hub, and means for insulating the arm from the wheel spokes, whereby the contact arm will be moved upon its immovable member when the wheel and post are turned, said insulating means including a body of insulating material mounted upon the portion of the contact arm extending between the spokes of the wheel and projecting from opposite sides of said arm.

Signed at Seattle, Washington, this 6th day of December, 1921.

JAMES H. DENNIS.